United States Patent
Di Modugno et al.

(10) Patent No.: US 9,464,227 B2
(45) Date of Patent: Oct. 11, 2016

(54) MOISTURIZING AGENTS

(71) Applicant: LAMBERTI SpA, Albizzate (Varese) (IT)

(72) Inventors: Rocco Di Modugno, The Woodlands, TX (US); Don Spier, Silver Lake, WI (US); Dario Chiavacci, Castronno (IT); Chiara Cipriani, Schianno (IT); Stefania Vecchi, Callvallasca (IT); Giovanni Floridi, Novara (IT); Giuseppe Li Bassi, Givirate (IT)

(73) Assignee: LAMBERTI SPA, Albizzate (VA) (IT)

( * ) Notice: Subject to any disclaimer, the term of this patent is extended or adjusted under 35 U.S.C. 154(b) by 95 days.

(21) Appl. No.: 14/223,341

(22) Filed: Mar. 24, 2014

(65) Prior Publication Data
US 2015/0267114 A1 Sep. 24, 2015

(51) Int. Cl.
*C09K 17/32* (2006.01)
*C08B 11/12* (2006.01)
*C08L 1/28* (2006.01)

(52) U.S. Cl.
CPC .............. *C09K 17/32* (2013.01); *C08B 11/12* (2013.01); *C08L 1/286* (2013.01)

(58) Field of Classification Search
None
See application file for complete search history.

(56) References Cited

U.S. PATENT DOCUMENTS

| 4,795,327 A * | 1/1989 | Gaylord | A61K 9/2054 424/465 |
| 4,865,640 A | 9/1989 | Avera | |
| 2009/0035426 A1* | 2/2009 | Verrall | C08L 1/286 426/291 |
| 2009/0252767 A1* | 10/2009 | Durig | A61K 9/4891 424/400 |

FOREIGN PATENT DOCUMENTS

| EP | 0382577 B1 | 5/1996 | |
| EP | 0465992 B1 | 6/1998 | |
| GB | 2281073 A | 2/1995 | |
| WO | WO 0040223 A1 * | 7/2000 | ............ A61K 9/209 |
| WO | 0215687 A2 | 2/2002 | |
| WO | 2005012540 A1 | 2/2005 | |
| WO | 2007146055 A2 | 12/2007 | |

OTHER PUBLICATIONS

Ashland, "Product Grades Available," © 2012-2015, Ashland, p. 1-4.*

* cited by examiner

*Primary Examiner* — Tracy Vivlemore
*Assistant Examiner* — Monica Shin
(74) *Attorney, Agent, or Firm* — Mossman, Kumar & Tyler, PC

(57) ABSTRACT

A concentrated aqueous composition may be prepared by from a formulation including: a. from 10 to 30% by weight (% wt) of a depolymerized carboxymethyl cellulose having a weight average molecular weight of from about 10,000 to about 80,000 dalton (Da); b. from 15 to 50% of a compatibilizer selected from the group consisting of glycerol and sodium xylene sulfonate; and c. from about 0.5 to about 20% by weight of a surfactant. The concentrated aqueous solution may be employed to prepare an aqueous solution which is useful for moisturizing soil.

14 Claims, No Drawings

MOISTURIZING AGENTS

BACKGROUND OF THE INVENTION

The present invention relates to aqueous, concentrated compositions for preparing moisturizing agents for soils comprising a depolymerized carboxymethyl cellulose, a compatibilizer and at least one surfactant.

This invention also pertains to aqueous solutions prepared from the compositions and to a method for moisturizing soils.

Plants require specific amounts of moisture to germinate, grow and remain viable. In conditions of water scarcity and/or high evapotranspiration, soil loses water rapidly due to high temperatures, low humidity, high winds and plant transpiration. Moisture in the soil is drawn to exposed soil surfaces by capillary action and lost by evaporation into the air. At the same time, moisture drawn from the soil into plant root fibers by osmosis is transpired through the plant stems and leaf systems, and that fraction not converted by photosynthesis is then lost by evaporation from pores of leaf surfaces. Under such conditions, soil volumetric water content can decrease significantly.

Moreover, irrigation water applied to coarse, sandy soils, can move past the plant root zone due to channeling, defined as the rapid movement of water downward through large pore spaces, and lack of retention, caused by lack of organic matter available to absorb available water.

Also water repellent soils present significant hydrologic and agronomic challenges. Since they are characterized by changes in the surface chemistry that impede or completely inhibit hydration, they show retarded water infiltration into the soil (leading to runoff, erosion, and leaching) and strong effects on the regular growth and maintenance of turf grass and a variety of agricultural crops.

Where there is a marked change in ground temperatures between day and night, there is a significant air inhalation into porous soils during the night-time cooling (contraction) cycle and exhalation of air and moisture in the heat of the day. This further aggravates the overall evaporative moisture loss.

Moisture is typically added to the soil by watering using manual or automatic means, such as sprinkler and drip irrigation systems. Such systems must nevertheless be connected to expensive and elaborate irrigation conduits and controls, which severely limit usage and have high energy consumption.

A further method for maintaining the ground moisture, utilizes the sponge like materials which are previously mixed with the soil surrounding the plant roots and then imbued with water during the sprinkling watering either natural or artificial. These materials usually are not biodegradable and contaminate the soils in which are inserted.

Many methods use moisturizing agents as soil additives to increase volumetric water content. The moisturizing agents are usually compositions of (co)polymers of natural, semi-synthetic or synthetic origin.

These polymer compositions are mixed into an aqueous solution or suspension and applied to the soil surface. The application can be accomplished in variety of ways, including but not limited to, spraying, casting, mulching, tilling or otherwise incorporating into the top layers of soils.

One of the polymers suitable as moisturizing agents is carboxymethyl cellulose (CMC). Carboxymethyl cellulose is able to absorb and hold water, when irrigation water is applied, and release it during irrigation intervals or dry periods.

For example, WO 2007/146055 describes a substrate, which releases impregnated water, gas and nutrients when interacting with biological organisms, comprising a mixture of a salt of carboxymethyl cellulose compound, having an average molecular weight ranging between 90,000 and 700,000, a hydrated metallic salt, water, a micro-nutrient selected from the group consisting of zinc and zinc salts, at least one plant growth additive selected from the group consisting of plant growth hormones and plant growth regulators, at least one preservative, a surfactant, and an acetic acid component selected from the group consisting of acetic acid or acetic acid salts.

U.S. Pat. No. 4,865,640 claims a substrate which gradually releases impregnated water and gas when interacting with a biological organism essentially comprising a mixture of: a) cellulosic compound ranging from 13% by weight having an average molecular weight ranging between 90,000 and 700,000 represented by the formula: R—O—COOM, in which "M" is a metal substituted for hydrogen on the carboxyl group of the cellulosic compound and "R" is cellulosic chain; b) a hydrated metallic salt ranging from 0.1-0.3% by weight; and c) water ranging from 97-99% by weight.

Sometimes, when watering process is supposed to be optimized for the growing conditions, localized dry spots ("LDS") may take place also in the presence of a moisturizing agent. It can be caused by excessive thatch, compacted soil, poor irrigation coverage, steep sloping grade (water runoff), high soil salinity, improper chemical usage, insects, diseases and water-repellent soil. LDS is characterized by irregular, isolated, hydrophobic areas problematic in the crop or turf stand.

The number of localized dry spots caused by inhomogeneous water distribution can be minimized by adding surfactants to the moisturizing agents. In fact the surfactants acting as wetting agent allow water to spread horizontally and to penetrate to a useful depth through the small channels and capillaries of the soil without being repelled or retained mainly on the surface or in defined area.

This solution is described in WO 02/15687, which relates to soil treatment compositions comprising:
an active ingredient selected from the group consisting of a water soluble or dispersible polymer, a surfactant, and a combination of ingredients I and II; and B) the balance carriers and other adjunct ingredients.

The water soluble or dispersible polymer can be a polysaccharide and carboxymethyl cellulose is mentioned among the polysaccharides. In the Examples, three CMC with molecular weight ranging from 90,000 to 700,000 dalton are utilized. No particular effect of the molecular weight on the performances is described.

Usually the moisturizing agents, such as CMC, are directly applied on soil as aqueous solutions which are prepared at the application site. It is important that all the components of the moisturizing agents are correctly dosed and well dissolved to ensure that no under dosing or over-dosing on the soil is obtained.

However, carboxymethyl cellulose can be difficult to be used in field situations and in solid form it takes a long time to dissolve, also under high shear stirring.

A good solution to this problem would be preparing a concentrated aqueous composition of carboxymethyl cellulose and surfactants which can be easily dosed and homogenized.

Unfortunately, it is difficult to combine adequate quantities of carboxymethyl cellulose and surfactants in concentrates and/or to obtain stable compositions in all cases.

Furthermore, the types of surfactants will be limited to those compatible with the carboxymethyl cellulose.

Accordingly, there is still a need for a concentrated aqueous composition of carboxymethyl cellulose and a surfactant which can be easily diluted and applied, has increased efficacy on any kind of soil and can improve water usage efficiency by plants and grasses.

We have discovered that a concentrated aqueous composition of a depolymerized carboxymethyl cellulose (depolymerized CMC) and surfactants can be prepared with the help of a compatibilizer. These concentrates may contain high amounts of carboxymethyl cellulose and surfactants, are stable, pourable and can be easily diluted at the application or mixing site to prepare ready-to-use moisturizing agents.

The moisturizing agent can be applied to the soil and will reduce the losses of moisture from direct evaporation or from channelling and run-through, improves the proportion of soil moisture accessible to plants, and in certain conditions prevents or even reverses the evaporative loss from day/night movement in and out of porous soils. At the same time the presence of the surfactant allows water to properly hydrate the soil.

As far as the Applicant knows, no one has described the specific combination of depolymerized CMC, surfactant and compatibilizer of the present disclosure.

According to the invention, the expression "depolymerized CMC" defines a carboxymethyl cellulose whose weight average molecular weight has been reduced between 10,000 and 80,000 dalton through a chemical, enzymatic or physical treatment or a combination of these treatments.

According to the invention, the weight average molecular weight of CMC is determined by gel permeation chromatography (GPC) calibrated with pullulane standards.

The expression "degree of substitution" (DS) means the average number of carboxymethyl groups for each hydroglycosidic unit of the cellulose.

SUMMARY OF THE INVENTION

It is therefore an object of the present invention to prepare a concentrated aqueous composition for the preparation of moisturizing agents comprising: from 10 to 30% by weight (% wt) of a depolymerized carboxymethyl cellulose (depolymerized CMC) having a weight average molecular weight comprised between 10,000 and 80,000 dalton (Da); from 15 to 50% by weight of a compatibilizer chosen among glycerol and sodium xylene sulfonate; from 0.5 to 20% by weight of at least a surfactant.

In an another aspect, the present invention relates to a method for moisturizing soils comprising i) preparing an aqueous solution ready to be applied comprising from 0.1 to 3.5% by weight, more preferably from 0.5 to 2% by weight, of the concentrated aqueous composition, and ii) applying the aqueous solution on soil.

DETAILED DESCRIPTION OF THE INVENTION

According to a preferred aspect of the invention, the aqueous concentrated composition comprises:
from 12 to 25% wt of the depolymerized CMC;
from 25 to 45% wt of the compatibilizer;
from 0.5 to 10% wt of at least a surfactant.

In a particularly preferred embodiment of the invention, the aqueous concentrated composition comprises:
from 12 to 25% wt of the depolymerized CMC;
from 32 to 45% wt of the compatibilizer;
from 0.5 to 5% wt of at least a surfactant.

According to the invention, a preferred depolymerized CMC has a weight average molecular weight comprised between 15,000 and 50,000 Da, more preferably from 20,000 to 40,000 Da.

Advantageously, the depolymerized CMC has a degree of substitution (DS) ranging from 0.4 to 1.6, more preferably from 0.6 to 1.2.

The Brookfield viscosity of the depolymerized CMC measured at 20 rpm and 20° C. in water solution at 25% wt concentration is usually below 6500 mPa*s, preferably below 4000 mPa*s.

Usually, the depolymerized CMC of the invention is salified with alkali metal ions, such as sodium or potassium, or ammonium or quaternary ammonium ions. Preferably, the depolymerized carboxymethyl cellulose of the invention is salified with potassium or sodium ions, more preferably with potassium ions.

Many methods useful for the depolymerisation of carboxymethyl cellulose are known; we cite, by way of example, those reported in: EP 382577, where enzymatic hydrolysed from cellulose derivative are described; GB 2,281,073, where the procedure for obtaining solutions of low viscosity carboxymethyl cellulose from the dissolution of solid mixtures of carboxymethyl cellulose and enzymes is described; EP 465992, where a procedure for the depolymerisation of cellulose ethers with hydrogen peroxide in water is described; EP 708113, where the obtainment of low molecular weight cellulose ethers by irradiation is described; WO/2005/012540, which describes a procedure for the enzymatic depolymerisation of medium viscosity carboxymethyl cellulose in the form of dispersed powder in a hydro-alcoholic heterogeneous medium;

Practically all these methods are utilizable for the preparation of a depolymerized CMC suitable for the composition of the invention. Depolymerized CMC obtained from an enzymatic depolymerization process is the preferred choice.

The depolymerization methods can be applied both on purified and technical grade carboxymethyl cellulose.

Advantageously, the depolymerized CMC is obtained from a technical grade carboxymethyl cellulose having a content of active substance of from 55 to 75% wt as dry matter. Technical grade CMC are not washed after the etherification reaction and usually contain from 25 to 45% wt as dry matter of the carboxymethylation by-products. These by-products are mainly, depending on the salification of the CMC, salts of chloride and glycolate, such as sodium chloride and sodium glycolate.

Preferably, in the concentrated aqueous composition for the preparation of moisturizing agents of the present disclosure the compatibilizer is glycerol.

Anionic, cationic, non-ionic and ampholytic surfactants and mixtures thereof can be used as the surfactant c). Preferably the surfactants are anionic surfactants.

Suitable surfactants are, for example, nonionic emulsifiers and dispersants, such as: polyalkoxylated, preferably polyethoxylated, saturated and unsaturated aliphatic alcohols, having 8 to 24 carbon atoms in the alkyl radical, which is derived from the corresponding fatty acids or from petrochemical products, and having 1 to 100, preferably 4 to 40, ethylene oxide units (EO); polyalkoxylated, preferably polyethoxylated, arylalkylphenols, such as, for example, tristyrylphenol having an average degree of ethoxylation of between 8 and 80, preferably from 16 to 40; polyalkoxylated, preferably polyethoxylated, alkylphenols having one or more alkyl radicals, such as, for example, nonylphenol or tri-sec-butylphenol, and a degree of ethoxylation of between 2 and 40, preferably from 4 to 20; polyalkoxylated, preferably polyethoxylated, hydroxy-fatty acids or glycerides of hydroxy-fatty acids, such as, for example, castor oil, having a degree of ethoxylation of between 10 and 80; sorbitan or sorbitol esters with fatty acids or polyalkoxylated, preferably polyethoxylated, sorbitan or sorbitol esters; polyalkoxylated, preferably polyethoxylated, amines; di- and tri-block copolymers, for example from alkylene oxides, for example from ethylene oxide and propylene oxide, having average molar masses between 200 and 8000 g/mol, preferably from 1000 to 4000 g/mol; alkylpolyglycosides or polyalkoxylated, preferably polyethoxylated, alkylpolyglycosides.

Preferred nonionic surfactants are polyethoxylated alcohols, preferably from renewable resources, such as ethoxylated (4-8 EO) $C_{12}$-$C_{14}$ natural alcohol; polyethoxylated triglycerides of hydroxy-fatty acids and polyethylene oxide/polypropylene oxide block copolymers.

Also suitable are anionic surfactants, for example: polyalkoxylated, preferably polyethoxylated, surfactants which are ionically modified, for example by conversion of the terminal free hydroxyl function of the alkylene oxide block into a sulfate or phosphate ester;
alkali metal and alkaline earth metal salts of alkylarylsulfonic acids having a straight-chain or branched alkyl chain;
alkali metal and alkaline earth metal salts of paraffin-sulfonic acids and chlorinated paraffin-sulfonic acids;
polyelectrolytes, such as lignosulfonates, condensates of naphthalenesulfonate and formaldehyde, polystyrenesulfonate or sulfonated unsaturated or aromatic polymers;
anionic esters of alkylpolyglycosides, such as alkylpolyglucosidesulfosuccinate or citrate; sulfosuccinates which are esterified once or twice with linear, or branched aliphatic, cycloaliphatic and/or aromatic alcohols, or sulfosuccinates which are esterified once or twice with (poly)alkylene oxide adducts of alcohols.

Preferred anionic surfactants are, for example, salts of alkyl sulfosuccinic acids, such as sodium dioctyl sulfosuccinate, and anionic esters of alkylpolyglycosides, in particular alkylpolyglucoside citrate.

Examples of cationic and ampholytic surfactants are quaternary ammonium salts, alkyl amino acids, and betaine or imidazolineamphotensides.

Optionally, the concentrated aqueous composition also includes drift retardants, humectants, corrosion inhibitors, microbial inhibitors, pH adjusters, anti-foam agents or mixture thereof.

The concentrated aqueous composition of the invention can be prepared by simply mixing the various components and the other optional additives with water. Since the depolymerized CMC is typically provided as a concentrated liquid solution or dispersion (20-45% by weight), usually the compatibilizer, the at least one surfactant and the other additives are added, possibly with water, to the solution or dispersion of depolymerized CMC.

The concentrated compositions of the invention have a Brookfield® viscosity comprised between 100 and 800 mPa*s, preferably between 200 and 500 mPa*s.

These concentrated aqueous compositions can be diluted just before use with water to provide the aqueous solutions, which can be directly applied on the soil.

Preferably, the aqueous solutions of the present invention comprise from 1 to 2% by weight of the above described concentrated aqueous composition.

The here disclosed aqueous solutions may consists of depolymerized CMC, a compatibilizer and at least one surfactant; conveniently they may also contain agrochemical active ingredients such as insecticides, herbicides, stabilizers, adjuvants, pH adjusters, anti-foam agents, plant nutrients including fertilizers and heavy metals, and the like. Preferred agrochemical active ingredients are plant nutrients.

The aqueous solutions of the present invention can comprise from about 0.01 to about 8% wt, preferably from about 1% to about 4% wt, of agrochemical active ingredients.

Examples of suitable fertilizers include sources of nitrogen, of phosphorous, of potassium and mixture thereof. Non-limiting examples of sources of available nitrogen include, urea, ammonium nitrate, potassium nitrate, and mixtures thereof. Examples of available phosphorous include ammonium phosphate, diammonium hydrogen phosphate, ammonium dihydrogen monophosphate, sodium phosphate, sodium hydrogen phosphate, and mixtures thereof. Available sources of potassium include any suitable water soluble potassium salt.

Non-limiting examples of sources of heavy metals include chelated iron (chelated with EDTA), manganese, and zinc.

The disclosed aqueous solutions of the invention can be applied by, e.g., spraying between 60 to 500 l/ha, preferably 150 to 300 l/ha, or by sprinkling or dripping between 0.4 and 120 l/hour per emitter.

They can be applied to any kind of soil but they are particularly suited to: sandy soil, loamy soil, sandy clay loam, sandy clay, sandy as defined in "Soil Survey Manual" United States Dept. of Agric. U.S. Government Printing Office, Washington, D.C. 20402. (CHAPTER 3).

Since the preferred components of the aqueous solution are biodegradable, it may be periodically reapplied. The following experimental data show the stability and efficacy of the concentrated aqueous compositions of the invention.

EXAMPLES

Characterization Methods

The Brookfield® (BRK) viscosity of the CMC solutions was measured with a DV-E Brookfield® viscometer at 20° C. and at 20 rpm.

The degree of substitution (DS) of the carboxymethyl cellulose was measured following the ASTM Standard Test Method D1439-03 (Degree of Etherification).

The active matter content of the carboxymethyl cellulose was determined following the ASTM Standard Test Method D 1439-03 (Purity).

The reaction by-products content of the carboxymethyl cellulose was calculated by difference between the dry weight and the active matter content.

Gel permeation chromatography (GPC) was used to determine the weight average molecular weight (Mw), by using the following method.

Depolymerized CMC samples were prepared by dissolving at a concentration of 0.3% w/vol of sample in 0.10 M ammonium acetate ("mobile phase solution").

Pullulanes with molecular weights ranging from 5900 to 788000 Da were used as molecular weight standards.

Two hundred microliters of each solution, filtered on a 0.45 micron membrane filter were injected into a HPLC equipped with an evaporative light scattering detector.

The following columns were used at a temperature of 60° C.: SupelcoProgel—TSK G3000 PWXL, G5000 PWXL, G6000 PWXL, and Progel-TSK PWXL guard columns. The HPLC was set at a flow rate of 0.8 ml/min for 50 minutes.

Preparation of Depolymerized CMC

Four different CMC were depolymerized (see their characteristics in Table 1) according to the following method.

In a 130 l reactor 20 Kg of carboxymethyl cellulose were dispersed under stirring in 80 Kg of a water/isopropanol mixture (containing 41 wt % of isopropanol).

TABLE 1

| Characteristics | Sodium CMC | Sodium CMC | Potassium CMC | Potassium CMC |
|---|---|---|---|---|
| Grade | Purified | Technical | Purified | Technical |
| DS | 0.65 | 0.65 | 0.75 | 0.75 |
| Active Matter (% w/w) | 98 | 65 | 98 | 65 |
| 4% sol. BRK Viscosity (mPa*s) | 38.5 | 4110 | 484 | 1380 |
| Mw (Da) | 188,000 | 1,460,000 | 704,000 | 704,000 |

The pH was adjusted to 6.4 with 0.16 Kg of 50% wt NaOH and 9.1 Kg of 80% wt acetic acid, and the mixture was heated to 40° C. Then from 100 to 300 g of Indiage® Super L (a preparation of cellulose commercialized by Genencor International, having enzymatic activity of 2850 GTU/g) were added.

The dispersion was stirred for an appropriate time (between 30 and 180 minutes); the alcohol was then removed by distillation under vacuum at 40-45° C. until its residual concentration was about 0.5% wt (determined by Gas Chromatography); NaOH was added to raise the pH to 11.5 and the mixture was stirred at 67° C. for 60 minutes.

The mixture was cooled to 50° C., 0.6 Kg of a 30% wt aqueous solution of hydrogen peroxide were added, then heated to 65° C. and stirred for 30 minutes. 300 g of Terminox 50 Ultra (a catalase from Novozymes, DK) were added and the mixture was stirred for 10 minutes. The solution was cooled to 30° C. and 75 g of Carbosan CD40 (biocide from Lamberti SpA) were added.

Aqueous solutions of depolymerized carboxymethyl cellulose (see Table 2) were obtained.

TABLE 2

| Characteristics | CMC1[1] | CMC2[2] | CMC3[3] | CMC4[4] | CMC5[3] |
|---|---|---|---|---|---|
| Counter ion | K | K | Na | Na | Na |
| DS | 0.8 | 0.8 | 0.65 | 0.65 | 0.65 |
| Active Matter (% w/w) | 22 | 37 | 37 | 22 | 24 |
| By-products (% w/w) | 15 | 1 | 1 | 15 | 1 |
| BRK Viscosity (mPa*s) | 4360 | 5900 | 3500 | 4890 | 2420 |
| Mw (Da) | 34000 | 38500 | 29500 | 35000 | 76000 |

[1] from technical grade potassium CMC
[2] from purified grade potassium CMC
[3] from purified grade sodium CMC
[4] from technical grade sodium CMC Examples 1-20

Concentrated aqueous compositions according to the invention were prepared by mixing different amounts of CMC1-CMC5, the compatibilizers and coco-alkyl polyglucoside citrate (APG-Citrate, commercialized by Lamberti SpA as Eucarol AGE EC) or sodium dioctyl sulfosuccinate as described in Table 3, Table 4 and Table 5.

Table 3, Table 4 and Table 5 report also the appearance of the compositions, their Brookfield viscosity and their stability to a treatment at 54° C. for two weeks.

TABLE 3

| Ingredient (% w/w) | Ex. 1* | Ex. 2 | Ex. 3 | Ex. 4* | Ex. 5 | Ex. 6 | Ex. 7 | Ex. 8 |
|---|---|---|---|---|---|---|---|---|
| CMC1 | 13.2 | 13.2 | 13.2 | 13.2 | 13.2 | 13.2 | 13.2 | 13.2 |
| APG Citrate | 0.6 | 0.6 | 0.6 | 0.6 | | 7.0 | | |
| Sodium Dioctyl Sulfosuccinate | | | | | 7.0 | | 1.4 | 1.4 |
| Glycerol | | 38 | | | 30 | | 38 | |
| Sodium Xylene Sulfonate | | | 15.2 | | | 6 | | 15.2 |
| Propylene Glycol | | | | 38 | | | | |
| Water | Up to 100% | Up to 100% | Up to 100% | Up to 100% | Up to 100% | Up to 100% | Up to 100% | Up to 100% |
| Appearance | Hazy/liquid | Hazy/liquid | Hazy/liquid | Hazy/liquid | Hazy/liquid | Hazy/liquid | Hazy/liquid | Hazy/liquid |
| BRK Viscosity (mPa*s) | 250 | 450 | 400 | 250 | 520 | 450 | 415 | 455 |
| Stability 54° C. 15 days | PS | OK | OK | PS | OK | OK | OK | OK |

*Comparative;
OK = No phase separation;
PS = Phase separation

TABLE 4

| Ingredient (% w/w) | Ex. 9 | Ex. 10 | Ex. 11* | Ex. 12 | Ex. 13 | Ex. 14 | Ex. 15 | Ex. 16* |
|---|---|---|---|---|---|---|---|---|
| CMC1 | 13.2 | 13.2 | 13.2 | | | | | |
| CMC2 | | | | 13.2 | 13.2 | | | |
| CMC3 | | | | | | 22.2 | 22.2 | 22.2 |
| APG Citrate | | | 0.6 | | | 0.6 | 0.6 | 0.6 |
| Sodium Dioctyl Sulfosuccinate | | | | 1.4 | 1.4 | | | |
| Alcohol alkoxylate | 2.0 | 2.0 | | | | | | |
| Glycerol | 38 | | | 38 | | 38 | | |
| Sodium Xylene Sulfonate | | 15.2 | | | 15.2 | | 15.2 | |
| Propylene Glycol | | | | | | | | 38 |
| Dipropylene Glycol | | | 38 | | | | | |
| Water | Up to 100% | Up to 100% | Up to 100% | Up to 100% | Up to 100% | Up to 100% | Up to 100% | Up to 100% |
| Appearance | Hazy/liquid | Hazy/liquid | Hazy/Paste | Hazy/liquid | Hazy/liquid | Hazy/liquid | Hazy/liquid | Hazy/liquid |
| BRK Viscosity (mPa*s) | 430 | 450 | ND | 580 | 450 | 480 | 430 | 220 |
| Stability 54° C. 15 days | OK | OK | PS | OK | OK | OK | OK | PS |

*Comparative;
OK = No phase separation;
ND = Not Determined;
PS = Phase separation

TABLE 5

| Ingredient (% w/w) | Ex. 17 | Ex. 18 | Ex. 19 | Ex. 20 | Ex. 21* | Ex. 22* | Ex. 23* |
|---|---|---|---|---|---|---|---|
| CMC3 | 22.2 | 22.2 | | | | | |
| CMC4 | | | 22.2 | | | | |
| CMC5 | | | | 14.4 | | | |
| Purified Sodium CMC | | | | | 9.0 | 9.0 | 9.0 |
| APG Citrate | | | 0.6 | 0.6 | 0.6 | 0.6 | 0.6 |
| Sodium Dioctyl Sulfosuccinate | 17.5 | 17.5 | | | | | |
| Glycerol | 15 | | 38 | 38 | 38 | | |
| Sodium Xylene Sulfonate | | 6 | | | | | 15.2 |

TABLE 5-continued

| Ingredient (% w/w) | Ex. 17 | Ex. 18 | Ex. 19 | Ex. 20 | Ex. 21* | Ex. 22* | Ex. 23* |
|---|---|---|---|---|---|---|---|
| Propylene Glycol | | | | | | | 38 |
| Water | Up to 100% | Up to 100% | Up to 100% | Up to 100% | Up to 100% | Up to 100% | Up to 100% |
| Appearance | Hazy/ liquid | Hazy/ liquid | Hazy/ liquid | Hazy/ liquid | Hazy/ viscous liquid | Hazy/ viscous liquid | PS |
| BRK Viscosity | 400 | 420 | 550 | 550 | 1350 | 1270 | ND |
| Stability 54° C. 15 days | OK | OK | OK | OK | OK | OK | PS |

*Comparative
OK = No phase separation
ND = Not Determined
PS = Phase separation

The concentrated aqueous compositions prepared according to the invention are more stable and/or have a much lower viscosity then the comparative compositions. Application Tests Aqueous solutions were prepared diluting the concentrated compositions of Example 2-3, 5-8, 12-15, 17-19 and 21-22 with CIPAC D standard water. Soil columns (with diameter 5 cm) filled with 400 grams of sandy soil were prepared by carefully packing the soil to provide a bulk density of about 1.7 kg/dm$^3$ or greater. The composition of sandy soil used in the test was, by weight, 90.75% sand, 3.75% silt, and 5.5% clay.

A Waterscout Moisture Sensor by Spectrum Technologies was placed in the center of the column and buried at a depth of 6 cm, where the entire sensor was covered with soil. The volumetric water content (VWC %) was recorded using a Watchdog 1400 Microstation Drip irrigation was achieved dosing 36 mL of aqueous solution over a six hours period using a 798 MPT Titrino by Metrohm. The water sensor recorded the VWC % every thirty minutes for a 48 hours period in order to monitor soil wetting and water retention. Table 5 reports the concentration of the concentrated compositions and the VWC % after 24 and 48 hours.

TABLE 5

| Ingredient | % Concentration | VWC %24 h | VWC %48 h |
|---|---|---|---|
| Water | — | 2.9 | 2.4 |
| Example 2 | 1.5 | 4.5 | 3.5 |
| Example 3 | 1.5 | 4.4 | 3.7 |
| Example 5 | 1.5 | 5.1 | 3.8 |
| Example 6 | 1.5 | 4.8 | 3.7 |
| Example 7 | 1.5 | 4.4 | 3.7 |
| Example 8 | 1.5 | 5.2 | 3.9 |
| Example 12 | 1.5 | 5.4 | 4.1 |
| Example 13 | 1.5 | 5.2 | 4.0 |
| Example 14 | 1.5 | 4.3 | 3.6 |
| Example 15 | 1.5 | 4.1 | 3.7 |
| Example 17 | 1.5 | 5.0 | 3.8 |
| Example 18 | 1.5 | 5.1 | 3.7 |
| Example 19 | 1.5 | 6.2 | 5.0 |
| Example 21* | 1.5 | 2.1 | 2.0 |
| Example 22* | 1.5 | 2.2 | 2.0 |

*Comparative

The reported data demonstrate that the application of the aqueous solutions prepared diluting the concentrated aqueous composition of the invention increases the soil water retention to a marked extent. Particularly efficient are the aqueous solutions prepared from concentrated aqueous compositions comprising depolymerized technical CMC.

What is claimed is:

1. A concentrated aqueous composition comprising:
   a. from 10 to 30% by weight (% wt) of a depolymerized carboxymethyl cellulose having a weight average molecular weight of from about 10,000 to about 80,000 dalton (Da);
   b. from 15 to 50% of a compatibilizer selected from the group consisting of glycerol and sodium xylene sulfonate; and
   c. from about 0.5 to about 20% by weight of a surfactant.

2. The concentrated aqueous composition of claim 1 wherein the depolymerized carboxymethyl cellulose is present at a concentration of from about 12 to about 25 wt %.

3. The concentrated aqueous composition of claim 1 wherein the compatibilizer is present at a concentration of from about 25 to about 45 wt. %.

4. The concentrated aqueous composition of claim 1 wherein the surfactant is present at a concentration of from about 0.5 to about 10 wt. %.

5. The concentrated aqueous composition of claim 1 wherein the depolymerized carboxymethyl cellulose has a weight average molecular weight of from about 15,000 to about 50,000 Da.

6. The concentrated aqueous composition of claim 1 wherein the depolymerized carboxymethyl cellulose is a potassium salt.

7. The concentrated aqueous composition of claim 1 wherein the depolymerized carboxymethyl cellulose is prepared using a technical carboxymethyl cellulose with, as dry matter, an active substance content of from about 55 to about 75 wt % and from about 25 to 45% of carboxymethylation by-products.

8. The concentrated aqueous composition of claim 1 wherein the compatibilizer is glycerol.

9. The concentrated aqueous composition of claim 1 wherein the surfactant is selected from the group consisting of salts of alkyl sulfosuccinic acids and anionic esters of alkylpolyglycoside s.

10. A method for moisturizing soil comprising:
    preparing an aqueous solution comprising:
      from about 0.1 to about 3.5% by weight of a concentrated aqueous composition comprising:
        from 10 to 30 wt. % of a depolymerized carboxymethyl cellulose having a weight average molecular weight of from about 10,000 to about 80,000 Da;
        from about 15 to about 50 wt. % of a compatibilizer selected from the group consisting of glycerol and sodium xylene sulfonate; and
        from about 0.5 to about 20 wt. % of a surfactant; and
    applying the aqueous solution on the soil.

11. The method for moisturizing soils of claim 10 wherein the aqueous solution comprises from about 1 to about 2 wt % of the concentrated aqueous composition.

12. The method for moisturizing soils of claim 10, wherein the aqueous solution further comprises from about 0.01 to about 8% wt of agrochemical active ingredients.

13. The method for moisturizing soils of claim 10 wherein the compatibilizer is glycerol.

14. The method for moisturizing soils of claim 10 wherein the surfactant is selected from the group consisting of salts of alkyl sulfosuccinic acids and anionic esters of alkylpolyglycosides.

* * * * *